Oct. 6, 1964  E. J. DE RIDDER  3,151,711
DOUBLE FACED PANELS
Filed March 10, 1960  2 Sheets-Sheet 1
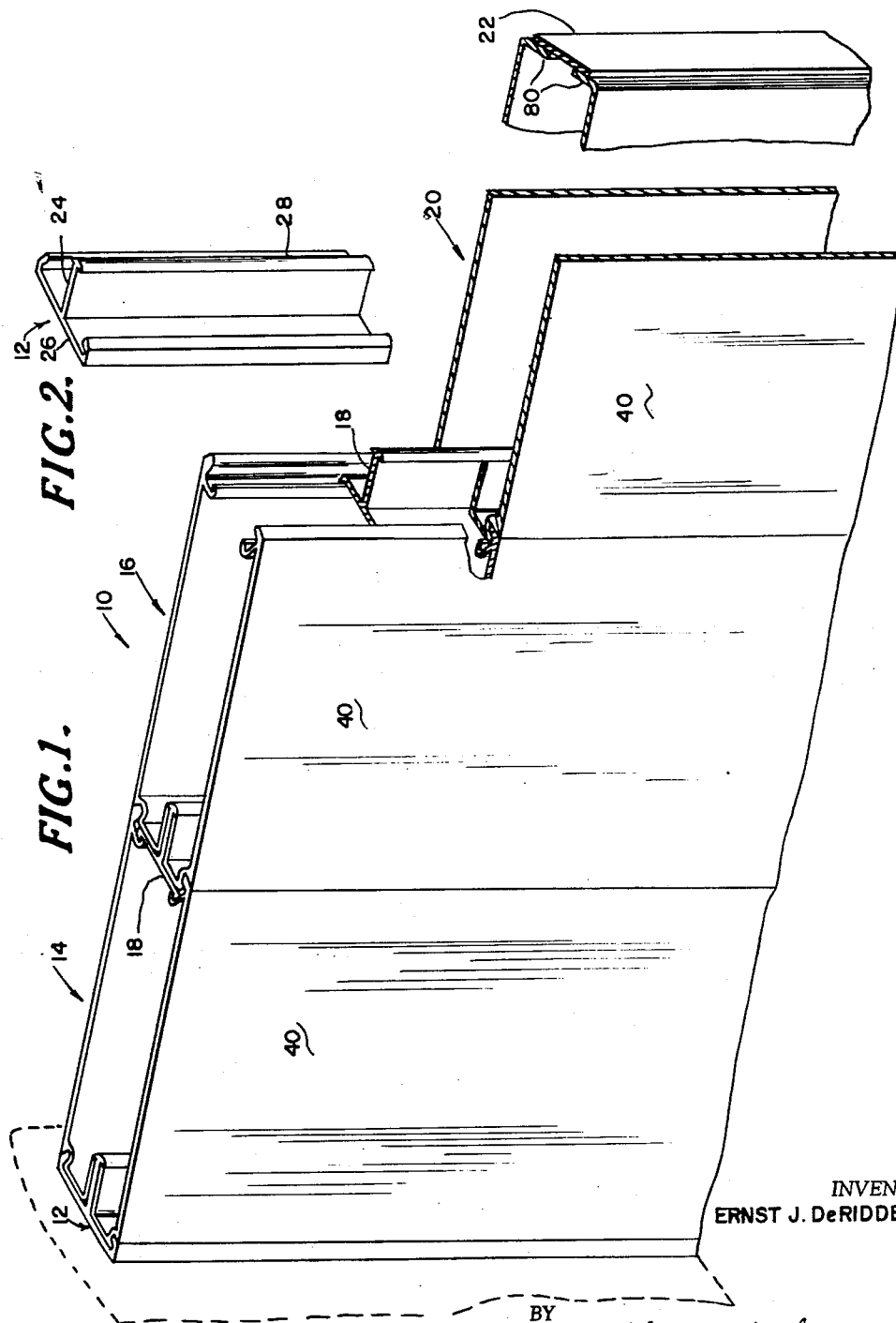
INVENTOR
ERNST J. DeRIDDER
BY
Glenn + Jackson
ATTORNEYS

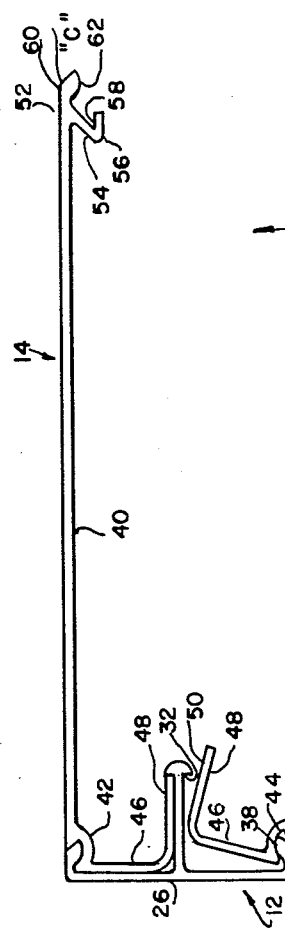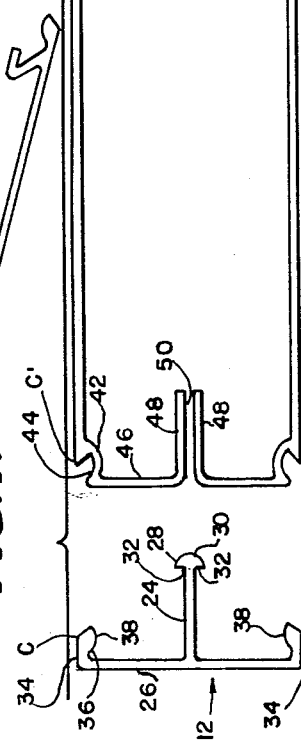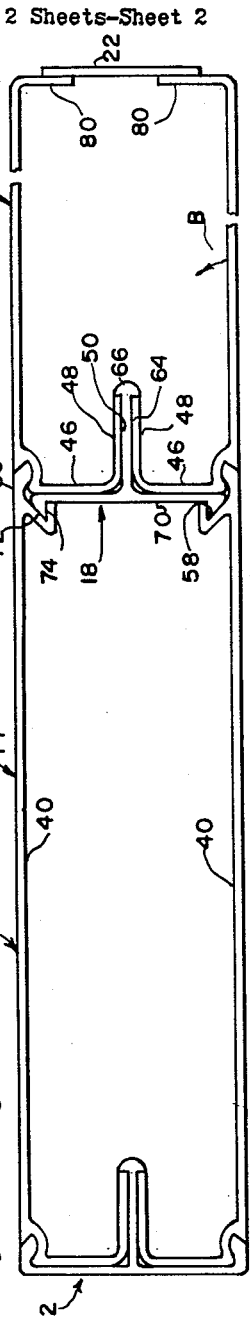
Oct. 6, 1964 E. J. DE RIDDER 3,151,711
DOUBLE FACED PANELS
Filed March 10, 1960 2 Sheets-Sheet 2
FIG.3.
FIG.4.
FIG.5.
INVENTOR
ERNST J. DeRIDDER
BY Glenn & Jackson
ATTORNEYS

United States Patent Office 3,151,711
Patented Oct. 6, 1964

3,151,711
DOUBLE FACED PANELS
Ernst J. De Ridder, Henrico County, Va., assignor to Reynolds Metals Company, Richmond, Va., a corporation of Delaware
Filed Mar. 10, 1960, Ser. No. 14,042
12 Claims. (Cl. 189—34)

The present invention relates to structural members adapted to be formed by extrusion and provided with complementary configurations so formed that the members can be interlockingly engaged and assembled into a hollow wall assembly having outwardly facing oppositely disposed panels. More specifically, the invention relates to a hollow wall assembly made from a plurality of panel-like sections having substantially identical profile configurations, and a plurality of extruded members for locking the sections together, the arrangement being such that the wall assembly, when complete, includes spaced apart walls having substantially smooth, flush outer wall surfaces.

The wall assembly of the present invention is capable of use as a partition wall, floor, door in buildings or the like or it may be used as a partition wall or cargo divider in trailers, freight cars or the like. Also, the hollow wall assembly of the present invention may be used wherever a panel assembly is desired. Such uses may be for highway signs where printing is desired on both sides of the sign, stressed panels in side walls of vehicles, and the like.

While the extruded structural members hereinafter described may be referred to as being made of metal, it is within the scope of the present invention for the members to be made of materials other than metal such as plastic or the like so long as the material may be extruded. Some of the sections may be made of one type of metal while others may be made of another type of metal and likewise, various combinations of metal and plastic sections may be used. Further, aluminum extruded sections have been found satisfactory for partition walls, floors, doors and the like wherein high structural loads may be expected to be encountered. In environments where extreme structural loads are not encountered, plastic extruded sections may be used and the wall assembled therefrom may have the hollow cavities between panels filled with insulating and/or soundproofing materials. For example, where the wall assembly is used in a building or vehicle and it is desired to refrigerate the area enclosed, a wall assembly made according to the present invention and provided with insulating material between the panels provides excellent results.

An object of the present invention is to provide a wall assembly made from a plurality of extruded sections, the extrusions being provided with improved complementary interlocking configurations whereby the assembly when fabricated requires no riveting or bolting together, yet, when the sections are assembled, the resulting wall is structurally strong.

Another object of the present invention is to provide a wall assembly made of a plurality of extruded sections, the sections being capable of interlocking with one another to provide a dual faced panel structure which is a substantially unitary structure.

A further object of the present invention is to provide a wall assembly made from a plurality of extruded sections which may be quickly assembled without the use of special tools and the like and, which when assembled, cannot be easily disassembled.

Still another object of the present invention is to provide a wall assembly made from a plurality of extruded sections, the fabrication of the wall assembly being such that there is versatility in making walls of various lengths and widths.

Other objects and advantages of the present invention will appear more fully in the following specification, claims and drawings in which:

FIGURE 1 is a fragmentary perspective view, partly in section, illustrating a wall assembly made in accordance with the present invention;

FIGURE 2 is a fragmentary perspective view of a T-shaped base member capable of closing off one end of the wall assembly of FIGURE 1;

FIGURE 3 is a transverse sectional view of a pair of extruded sections and the base member, the view illustrating assembly of the sections to the base member;

FIGURE 4 is an exploded transverse sectional view of the extruded sections illustrating the relationship of the sections to one another;

FIGURE 5 is a transverse sectional view of the wall assembly of the present invention showing the various extruded sections in their relative assembled interlocking relationship to one another.

Referring now to the drawings wherein like character or reference numerals represent like or similar parts, and in particular to FIGURE 1, a wall assembly generally designated at 10 of the present invention is illustrated. The wall assembly includes a base or end member generally designated at 12, a first pair of panel-like generally rectangular parallel extruded sections 14 interlocked with the base member, a second pair of panel-like generally rectangular parallel extruded sections 16 interlocked with the first pair 14, and an extruded T-shaped member 18 cooperating with the first and second pair of sections 14 and 16. Also, a third pair of panel-like generally rectangular parallel extruded sections 20 is illustrated interlocked with the second pair of sections 16 and a similar T-shaped member 18, the third pair of sections being provided with a plate 22 closing the same and forming the end of the wall assembly 10 opposite the base or end member 12.

The wall assembly 10 is shown with the pairs of extruded sections 14, 16 and 20 abutting and interlocking with one another respectively along the vertical edges of the same but it will be understood that the assembly may be arranged wherein the pairs of sections 14, 16 and 20 interlocked with one another respectively when the sections are positioned horizontally. Also, any number of pairs of extruded sections may be assembled depending upon the width of the panel assembly desired. The length of the panel assembly may be varied by cutting off the lengths of the extruded sections to a desired length. This latter operation may be accomplished at the site of assembly or the sections may be fabricated in different lengths at the manufacturing plant.

Referring now in more detail to FIGURES 2 and 4, the extruded T-shaped base or end member 12 is provided with a leg 24 and a cross element 26 integral therewith. The outer surface of the cross element 26 provides a smooth closed end for the length of the wall assembly 10. Leg 24 is provided along its free edges with a projection 28 having an outwardly facing curved surface 30 and inwardly facing flat surfaces 32 extending transverse to and outwardly from opposite sides of the leg. The cross element 26 is provided along each of its edges with a flange-shaped lip 34 integral therewith and extending inwardly with respect to the outer surface of the cross member. Each of the lips 34 is enlarged as indicated at 36 and is provided with an inwardly facing curved surface 38. The center of curvature C of the curved surface 38 is on the outer surface of the lip 34 which will be flush with the surface of an adjacent interlocked panel section as will be described later in the specification.

Each section of the pairs of sections are identical in sectional profile and include a generally rectangular shaped panel 40 having one longitudinal edge 42 offset inwardly to define an outwardly facing curved surface 44 having the same radius of curvature as the curved surface 38 and also having a center of curvature C' (FIGURE 4) at a point on the outer surface of the panel 40 where the edge is offset inwardly. Integral with the offset edge 42 of the section is a rib 46 which extends inwardly of the outer planar surface of the panel 40. A flange 48 integral with the edge of rib 46 extends parallel to and spaced inwardly from the inner surface of panel 40. Flange 48 is provided with an inwardly facing planar surface 50. Extending inwardly from the inner surface of panel 40 along an edge 52, which is opposite the edge 42, is a flange-shaped rib 54 having a hooked-shaped end 56. The rib 54 extends at an acute angle to the inner surface of the panel. The hooked-shaped end 56 is provided with a substantially flat surface 58 facing outwardly of the panel 40 and substantially parallel to the panel. An overhanging lip 60 along the edge 52 of the panel 40 is provided with a complementary configuration in profile to the offset edge 42 and as clearly shown in FIGURE 3, such complementary configuration includes an inwardly facing convexly curved surface 62 having the same radius of curvature as the concavely curved surface 44. A center of curvature C'' for the surface 62 is on the outer suface of the panel 40 at a point where the surface ends.

Referring now to FIGURE 3, one section of the pair of sections 14 is shown in interlocking engagement with the T-shaped base or end member 26. The other section of the pair is shown with its concave channel or curved surface 44 in partial engagement with the curved surface 38 of the lip 34 of the member 26. By pivoting the section in the direction of the arrow A, about the cooperating curved surfaces 38 and 44, the rib 46 and flange 48 move towards the cross element 26 of the T-member 12 until the panel 40 of the section is parallel with the oppositely disposed panel 40 of the other section. When the two panels 40 of each section of the pair of sections 14 are parallel, the flange 48 will have snapped over the projections 28 and the planar surface 50. The flanges 48 are then contiguous with the surfaces of the leg 24 of member 12 and it will also be noted that the ribs 46 are contiguous with the inner surface of the cross element 26. The flanges 48 have a width of such dimension that the longitudinal edge of the flange abuts against the inwardly facing planar surface 32 of the projection 28. As the lower panel 40 approaches a position parallel to the upper section 40, it will be noted that the planar surface 50 of the flange 48 will engage the projection and eventually snap over the same into a position similar to the position of the flange 48 of the upper panel 40. When both sections of the pair of sections 14 have been snapped into interlocking engagement with the member 12 as shown in FIGURE 5, the panels 40 of each section are locked in substantially parallel relationship to each other and form a portion of the hollow wall assembly 10. The sections cannot be easily disassembled because of the abutment of the edge of flange 48 with the surfaces 32 on projection 28.

Referring now to FIGURES 4 and 5, the T-shaped member 18 is provided with a leg 64 having a projection 66 extending along its free edge. The projection 66 is provided with the inwardly facing flat surfaces 68 extending on each of the leg 64. A cross element 70 of slightly less width than the cross element 26 of member 12 is provided along its edges with hooked-shaped ridges 72 having inwardly facing spaced apart flat surfaces 74 complementary to the flat surfaces 58 of the ribs 54. Outwardly of the flat surfaces 74 of ridges 72 is a sloping cam surface 76.

Referring now to FIGURE 5, when each section of the pair of sections 14 has been assembled on the member 12, the member 18 is moved from a position shown in FIGURE 4 toward the pair of sections 14 and its sloping surfaces 76 engage the inwardly facing curved surfaces 62 of overhanging lip 60 causing the two panel sections to flex apart slightly. When the cross element 70 of the member 18 has passed beyond the curved surfaces 62 of section 14, the panels 40 of section 14 flex back to their parallel position and the inwardly facing surfaces 74 of the cross element 70 engage the outwardly facing surfaces 58 of the hooked-shaped ribs 54. When in this position, the panels 40 cannot move apart and the next pair of sections 16 can be assembled thereto.

The assembly of the pair of sections 16 to the pair of sections 14 is substantially identical in operation as the assembly of each section 14 to the end member 12. In more detail, the complementary curved surfaces 44 of each section 16 are partially engaged with the complementary curved surfaces 62 on the overhanging lips 60. The sections are pivoted in the direction of the arrows B in FIGURE 5 until they assume the position shown in FIGURE 5 where the flanges 48 have snapped over the projection 66 of leg 64 of member 18. It will be noted that when the sections of the pair of sections 16 are in the position shown in FIGURE 5, the inner surface 50 of the flanges 48 are contiguous with the leg 64 whereas the end of the flanges abut the inwardly facing surface 68 of projection 66. Also, the rib 46 is contiguous with the inner surface of the cross element 70 of member 18. This provides a substantially tight leakproof joint between the pair of sections 14 and the pair of sections 16 without the use of rivets, screws or the like.

The end pair of sections 20 are identical in sectional profile as each section of the pairs of sections 14 and 16 with the exception that their free edge is not provided with hooked-shaped ribs 54 or the overhanging lip 60. Since the pair sections 20 must be closed off, any suitable plate 22 may abut inturned flanges 80 as shown in FIGURES 1 and 5, the plate 22 being spot welded or blind riveted thereto. In place of the plate 22, any suitable complementary end configurations may be provided integral with the ends of sections 20 and integral with a plate member closing the same.

The objects and advantages of this invention have been fully and effectively accomplished by the structure illustrated in the drawings as heretofore described. However, the structure is subject to some changes without departing from the principles of the invention involved.

The terminology used in the specification is for the purpose of description and not of limitation, the scope of the invention being defined in the claims.

I claim:

1. A hollow wall assembly comprising: at least a pair of generally rectangular spaced parallel extruded sections for forming at least portions of parallel walls having a pair of aligned side edges and outer oppositely disposed panel surfaces; a pair of ribs, one of said ribs being integral with one of said sections and extending inwardly from an edge of one of said pair of edges and the other of said ribs being integral with the other of said sections and extending inwardly from the other edge of said pair of edges toward said first-mentioned rib, each of said ribs having a flange extending from its free edge parallel to its respective section, said flange of one section being parallel to and spaced from the flange of said other section; and means to interlock said sections in spaced apart parallel relationship to each other, said means including a T-shaped member having a base leg with a projection extending outwardly of each surface of the leg along its free edge and a cross element, said T-shaped member having the surfaces of its leg contiguous with the inwardly facing opposed surfaces of said flanges and its projection abutting the edges of said flanges while said cross element is contiguous with said ribs, said cross element interlocking with said sections at points inboard of said outer surfaces thereof whereby said sections cannot move away from each other.

2. A hollow wall assembly comprising: at least a pair of generally rectangular spaced parallel extruded sections for forming at least portions of parallel walls having a pair of aligned side edges and outer oppositely disposed panel surfaces, a pair of ribs, one of said ribs being integral with one of said sections and extending inwardly from an edge of one of said pair of edges and the other of said ribs being integral with the other of said sections and extending inwardly from the other edge of said pair of edges for said first-mentioned rib, each of said ribs having a flange extending from its free edge parallel to its respective section, said flange of one section being parallel to and spaced from the flange of said other sections; and means to interlock said sections in spaced apart parallel relationship to each other, said means including a T-shaped member having a base leg with a projection extending outwardly of each surface of the leg along its free edge and a cross element, said T-shaped member having the surface of its leg contiguous with the inwardly facing opposed surfaces of said flanges and its projection abutting the edges of said flanges while said cross element is contiguous with said ribs, said means including complementary interlocking configurations integral with the free edges of the cross element of said T-shaped member and integral with said parallel aligned edges of said sections.

3. A hollow wall assembly comprising: at least a pair of generally rectangular spaced parallel extruded sections for forming at least portions of parallel walls having a pair of aligned side edges and outer oppositely disposed panel surfaces, a pair of ribs, one of said ribs being integral with one of said sections and extending inwardly from an edge of one of said pair of edges and the other of said ribs being integral with the other of said sections and extending inwardly from the other edge of said pair of edges toward said first-mentioned rib, each of said ribs having a flange extending from its free edge parallel to its respective section, said flange of one section being parallel to and spaced from the flange of said other section; and means to interlock the sections in spaced apart parallel relationship to each other, said means including a T-shaped member having a base leg with a projection extending outwardly of each surface of the leg along its free edge and a cross element, said T-shaped member having the surfaces of its leg contiguous with the inwardly facing opposed surfaces of said flanges and its projection abutting the edges of said flanges while said cross element is contiguous with said ribs, said means including a second pair of generally rectangular parallel extruded sections arranged in parallel alignment with said first pair of sections respectively and forming another portion of the parallel walls, and complementary interlocking configurations integral with free edges of the second pair of sections and integral with the parallel aligned edges of said first pair of sections.

4. The structure defined in claim 3 including inwardly facing and oppositely disposed hook-shaped projections on opposite parallel edges of the cross element of said T-member and cooperating outwardly facing and oppositely disposed flange-shaped hooks, one being integral with and extending along the free edge of one of said second pair of sections and the other being integral with and extending along the free edge of the other of said second pair of sections, said cross element cooperating with said second pair of sections whereby the hooked-shaped projections of the cross element cooperate with the flange-shaped hooks to maintain the position of said second pair of sections with respect to each other so that the interlocking configuration on the edge of each section of said first pair of sections can be partially engaged with a complementary interlocking configuration of said second section and said first section being then tilted inwardly until its flange snaps over the projection on the leg of said T-member and locks the same against displacement.

5. A hollow wall assembly comprising: a pair of rectangularly shaped parallel extruded sections for forming at least portions of parallel walls, said parallel sections having a pair of aligned side edges and outer oppositely disposed panel surfaces, said aligned side edges of each of said sections being inwardly offset from the outer panel surface and defining a channel having an outwardly facing curved surface which has a center of curvature on the panel surface at a point where the edge is offset inwardly, a rib integral with the inwardly offset edge of each section, one rib of one section extending inwardly of its outer panel surface and the other rib of the other section extending inwardly of its outer panel surface and toward said first-mentioned rib, a flange on the free edge of each rib extending parallel to the respective section, the flange of one section being parallel to the flange of the other section and spaced therefrom, said flanges having planar opposed surfaces; a T-shaped member having a base leg with a projection extending outwardly of each surface of the leg along its free edge and a cross element, said T-shaped member having its leg extending between said flanges and engaging the planar surface of the same with its projection abutting the end edges of the respective flanges; a second pair of rectangularly spaced parallel extruded sections having outer oppositely disposed panel surfaces, interlocking configurations integral with said cross element and integral with each of said second pair of sections, and a complementary configuration along the edge of each of said second sections for cooperating with said channels of said first pair of sections, and interlocking said first and second pair of sections together.

6. The structure of claim 5 wherein said interlocking configurations integral with said cross element and integral with each of said second pair of sections includes hooked-shaped projections along opposite edge of said cross element, said hooked-shaped projections having inwardly facing spaced apart planar surfaces, and flange-shaped hooks on back of said second pair of sections extending inwardly from the outer panel surfaces and having outwardly facing planar surfaces for cooperating with the planar surfaces of said hook-shaped projections of said cross element.

7. A hollow wall assembly comprising: at least a pair of generally rectangularly shaped parallel extruded sections for forming at least portions of parallel walls, said parallel sections having a pair of aligned side edges and outer oppositely disposed panel surfaces, said aligned side edges of each section being inwardly offset from the outer panel surface and defining a channel having an outwardly facing curved surface which has a center of curvature on the panel surface at a point where the edge is offset inwardly, a rib integral with the inwardly offset edge of each section, one rib of one section extending inwardly of its outer panel surface and the other rib of the other section extending inwardly of its outer panel surface and toward said first-mentioned rib, a flange on the free edge of each rib extending parallel to the respective section, the flange of one section being parallel to the flange of the other section and spaced therefrom, said flanges having planar opposed surfaces; and a T-shaped member interlocking said parallel sections together in spaced apart relationship, said T-shaped member having a leg portion extending between and contiguous with the parallel opposed surfaces of said flanges and a projection on the end of the same abutting the end edges of said flanges in abutting relationship, said T-shaped member having a cross element, said cross element having an inturned lip on each of its edges, each of said lips having an inwardly facing curved surface complementary to the outwardly facing curved surface of the channels of said sections, the arrangement being such that for assembly the channel of one section can be partially engaged with the lip of the cross element of said T-shaped member and then said one section can be pivoted about the engaging curved surfaces until said flange of said one section rides over the projection and snaps into place against the leg of said T- shaped member, the other section being likewise secured to said T-shaped member.

8. A hollow wall assembly comprising: a pair of spaced parallel sections each having a side edge disposed parallel to the side edge of the other section and having a panel surface disposed parallel to the panel surface of the other section, each section having a rib extending inwardly from said side edge thereof and having a flange connected to the free edge of said rib and disposed parallel to the panel surface thereof; and a T-shaped member having the base leg thereof interconnected to said flanges of said sections and having the cross element thereof effectively interlocked with said sections at points inboard of said panel surfaces thereof whereby said sections cannot move away from each other, said base leg having outwardly extending projection means abutting the free ends of said flanges.

9. A hollow wall assembly as set forth in claim 8 wherein said cross element of said T-shaped member has the ends thereof respectively interconnected to said sections.

10. A hollow wall assembly comprising: a pair of spaced parallel sections each having a side edge disposed parallel to the side edge of the other section and having a panel surface disposed parallel to the panel surface of the other section, each panel surface having a channel means disposed adjacent the side edge thereof, each section having a rib extending inwardly from said side edge thereof and having a flange connected to the free edge of said rib and disposed parallel to the panel surface thereof; and a T-shaped member having the base leg thereof interconnected to said flanges of said sections and having the cross element thereof provided with means respectively received in said channel means of said sections to interconnect said sections together, said base leg having outwardly extending projection means abutting the free ends of said flanges.

11. A hollow wall assembly comprising: a first pair of spaced parallel sections each having a side edge disposed parallel to the side edge of the other section and having a panel surface disposed parallel to the panel surface of the other section, each panel surface having a channel means disposed adjacent the side edge thereof, each first section having a rib extending inwardly from said side edge thereof and having a flange connected to the free edge of said rib and disposed parallel to the panel surface thereof; a T-shaped member having the base leg thereof interconnected to said flanges of said first sections and having the cross element thereof provided with projections at the outer ends thereof; and a second pair of sections each having a portion thereof interconnected to a projection of said cross element of said T-shaped member and having another portion thereof disposed in said channel means of one of said first sections to interconnect said sections together.

12. A hollow wall assembly comprising: a pair of spaced parallel sections each having a side edge disposed parallel to the side edge of the other section and having a panel surface disposed parallel to the panel surface of the other section, each section having a rib extending inwardly from said side edge thereof and having a flange connected to the free edge of said rib and disposed parallel to the panel surface thereof; a T-shaped member having a base leg thereof interconnected to said flanges of said sections and having the cross element thereof effectively interconnecting said sections together independently of the base leg thereof; and a second pair of sections interconnected to said cross element of said T-shaped member and interconnected to said first-named pair of sections.

References Cited in the file of this patent

UNITED STATES PATENTS

| | | |
|---|---|---|
| 1,815,477 | Richardson | July 21, 1931 |
| 1,829,331 | Barker et al. | Oct. 27, 1931 |
| 1,873,417 | Jones | Aug. 23, 1932 |
| 2,444,091 | Carlsen | July 29, 1948 |
| 2,508,066 | Holmstrom | May 16, 1950 |
| 2,752,672 | Tolman | July 3, 1956 |
| 2,786,556 | Constance | Mar. 26, 1957 |
| 2,799,481 | Becker | July 16, 1957 |
| 2,866,527 | Schilling | Dec. 30, 1958 |
| 2,926,928 | Bennett | Mar. 1, 1960 |
| 2,962,133 | Kivett et al. | Nov. 29, 1960 |
| 3,100,556 | De Ridder | Aug. 13, 1963 |